United States Patent
Saieg et al.

(10) Patent No.: US 8,333,396 B2
(45) Date of Patent: Dec. 18, 2012

(54) TOP MOUNT TRAILING ARM SUSPENSION

(75) Inventors: Steven G. Saieg, Rochester Hills, MI (US); Craig Holt, Chesterfield, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 190 days.

(21) Appl. No.: 12/652,259

(22) Filed: Jan. 5, 2010

(65) Prior Publication Data

US 2011/0163514 A1 Jul. 7, 2011

(51) Int. Cl.
*B60G 3/12* (2006.01)

(52) U.S. Cl. .......................... 280/124.128; 280/124.116

(58) Field of Classification Search ........... 280/124.128, 280/124.116
See application file for complete search history.

(56) References Cited

U.S. PATENT DOCUMENTS

| | | | |
|---|---|---|---|
| 4,693,486 A | 9/1987 | Pierce et al. | |
| 4,995,636 A | 2/1991 | Hall et al. | |
| 5,112,078 A | 5/1992 | Galazin et al. | |
| 5,366,237 A | 11/1994 | Dilling et al. | |
| 5,375,871 A | 12/1994 | Mitchell et al. | |
| 5,690,353 A | 11/1997 | Vandenberg | |
| 6,241,266 B1 | 6/2001 | Smith et al. | |
| 6,491,314 B2 | 12/2002 | Smith et al. | |
| 6,508,393 B2 | 1/2003 | Chalin | |
| 6,508,482 B2 | 1/2003 | Pierce et al. | |
| 6,557,875 B2 | 5/2003 | Schlosser et al. | |
| 6,733,020 B2 | 5/2004 | Reineck | |
| 6,827,360 B2 | 12/2004 | Chan et al. | |
| 6,843,490 B2 | 1/2005 | Raidel, II et al. | |
| 7,048,288 B2 | 5/2006 | Chan et al. | |
| 7,077,411 B2 | 7/2006 | Peters et al. | |
| 7,086,655 B2 | 8/2006 | Chan et al. | |
| 7,178,816 B2 * | 2/2007 | Chan et al. ............. | 280/124.116 |

(Continued)

FOREIGN PATENT DOCUMENTS

DE 490858 2/1930

(Continued)

OTHER PUBLICATIONS

Failure Analysis of Heavy Truck Trailer Axles (1998), Robert Kadlec, Russell Westmann, Mehrdad Haghi, et al.; Technology, Law and Insurance, 3:1, 25-31.

*Primary Examiner* — Toan To
(74) *Attorney, Agent, or Firm* — Carlson, Gaskey & Olds, PC

(57) ABSTRACT

A trailing arm suspension includes a trailing arm body having an axle mount portion that is attached to an axle wrap. The axle wrap includes at least one internal weld window to secure the axle wrap to an axle. In one example, the internal weld window is positioned within an internal cavity defined by the trailing arm body and axle wrap includes an external weld window located external of the trailing arm body. In one example, the trailing arm suspension includes a reinforcement bracket that is attached to both the trailing arm body and the axle wrap. In one example, a spring pedestal includes a support plate at one end of trailing arm body and a side wall portion that extends downwardly from the support plate to be attached to the axle wrap. In one example, the axle wrap includes a weld window having a V-shaped lower edge surface.

26 Claims, 7 Drawing Sheets

U.S. PATENT DOCUMENTS

| | | | |
|---|---|---|---|
| 7,252,298 B2 | 8/2007 | Hughes | |
| 7,270,342 B2 | 9/2007 | Chan et al. | |
| 7,360,774 B2 * | 4/2008 | Saieg et al. | 280/124.128 |
| 7,549,659 B2 | 6/2009 | Reineck | |
| 7,607,670 B2 * | 10/2009 | Raidel et al. | 280/124.11 |
| 7,618,049 B2 | 11/2009 | Varela et al. | |
| 7,669,866 B2 | 3/2010 | Peaker et al. | |
| 7,726,673 B2 * | 6/2010 | Saieg et al. | 280/124.128 |
| 7,775,535 B2 * | 8/2010 | Bluff et al. | 280/124.116 |
| 7,854,438 B2 * | 12/2010 | Richardson | 280/124.116 |
| 7,946,601 B2 | 5/2011 | Hughes | |
| 8,006,987 B2 | 8/2011 | Saieg | |
| 2001/0020775 A1 * | 9/2001 | Pierce et al. | 280/124.128 |
| 2003/0146592 A1 * | 8/2003 | Chalin et al. | 280/124.116 |
| 2004/0183271 A1 * | 9/2004 | Galazin et al. | 280/124.128 |
| 2006/0163834 A1 | 7/2006 | Brereton et al. | |
| 2006/0237940 A1 | 10/2006 | Raidel, II et al. | |
| 2008/0224435 A1 | 9/2008 | Holt | |

FOREIGN PATENT DOCUMENTS

| | | |
|---|---|---|
| DE | 1088362 | 9/1960 |
| DE | 1580533 | 6/1970 |
| EP | 0296568 | 6/1988 |
| EP | 0529165 | 3/1993 |
| FR | 2570994 | 4/1986 |
| JP | 3287404 | 12/1991 |

* cited by examiner

TOP MOUNT TRAILING ARM SUSPENSION

TECHNICAL FIELD

The subject invention relates to a trailing arm trailer suspension that is lightweight and includes an axle wrap configuration that increases suspension fatigue life.

BACKGROUND OF THE INVENTION

A suspension system includes a pair of trailing arm assemblies that are attached to an axle beam member. One trailing arm assembly is positioned near one end of the axle beam member, and another trailing arm assembly is positioned near an opposite end of the axle beam member. The trailing arm assemblies are pivotally connected to a vehicle frame member at a first end and support air springs at a second end. The trailing arm assemblies are attached to the axle beam member at a position between the first and second ends. The trailing arm assemblies need to be lightweight and must be capable of operating under high load conditions.

SUMMARY OF THE INVENTION

The subjection invention comprises trailing arm assembly for a suspension that includes a trailing arm body with an axle mount portion, and an axle wrap with an axle receiver portion to be attached to an axle body. The trailing arm body is attached to the axle wrap at the axle mount portion and the axle wrap includes at least one axle wrap feature that improves suspension fatigue life.

In one example, the axle wrap feature comprises a reinforcement bracket that is attached to both the trailing arm body and the axle wrap.

In one example, the axle wrap feature comprises a mount interface for connection to a spring pedestal. The spring pedestal includes a support plate positioned at one end of the trailing arm body and a side wall portion that extends downwardly to be attached to the axle wrap at the mount interface.

In one example, the axle wrap feature comprises an additional weld window that is formed within the axle wrap at a location external to the trailing arm body. The axle wrap is comprised of first and second wrap portions that cooperate to substantially surround the axle body. One of the first and second wrap portions includes an internal weld window positioned within an internal cavity defined by the trailing arm body. The additional weld window comprises an external weld window that is located outwardly of the trailing arm body.

In one example, the axle wrap feature comprises a weld window that is defined by a lower edge surface comprising a V-shaped surface. In one example, the lower edge surface has at least one portion that is non-parallel to an upper edge surface of the weld window.

In one example, the subject trailing arm assembly is utilized within a vehicle suspension to support a trailer axle. The trailing arm assemblies include one or more of the axle wrap features discussed above.

These and other features of the present invention can be best understood from the following specification and drawings, the following of which is a brief description.

DETAILED DESCRIPTION OF THE PREFERRED EMBODIMENT

Figure 1:
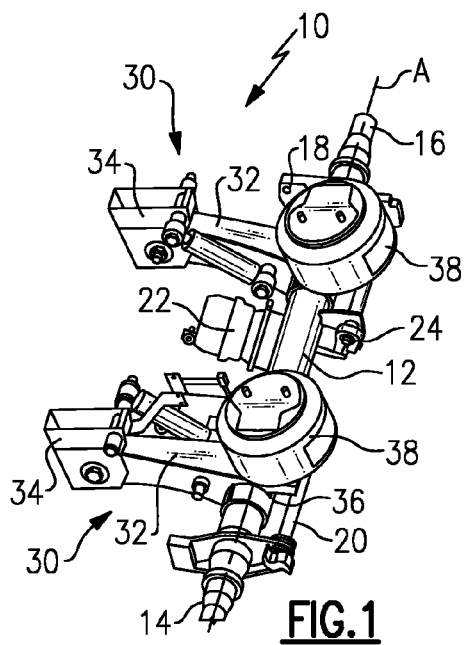
FIG. 1 is a perspective view of a trailing arm suspension incorporating the subject invention and which includes air springs, brake chambers, and frame mounting structure.

A trailing arm suspension system 10 is shown in FIG. 1. The trailing arm suspension system 10 supports a trailer axle 12 relative to a vehicle structure such as a frame or chassis, for example. While an example of one trailer axle configuration is shown in FIG. 1, the trailing arm suspension system could be used with other axle configurations.

The trailer axle 12 extends along a lateral axis A between first 14 and second 16 axle ends that respectfully support first and second wheels (not shown). A brake spider 18 is mounted adjacent each of the first 14 and second 16 ends. The brake spider 18 supports a cam shaft 20 that is coupled to a brake air chamber 22. Slack adjusters 24, which are coupled between the brake air chamber 22 and cam shaft 20, are used to adjust brake clearance between brake shoes and a brake drum (not shown). It should be understood that while the axle is shown with a drum brake configuration, other brake configurations could also be used.

Inboard of the brake spiders 18 are trailing arm assemblies 30. Each trailing arm assembly 30 has a first end 32 to be mounted pivotally mounted to the vehicle structure with a bracket 34 and a second end 36 that extends in a longitudinal direction toward the trailer axle 12. The second end 36 of each trailing arm assembly 30 supports a resilient member 38, such as an air spring for example.

The trailing arm assemblies 30 are shown in greater detail in FIGS. 2-8. Each trailing arm assembly 30 includes a trailing arm body 40 with an axle mount portion 42. The trailing arm body 40 comprises a box-shaped structure having an upper wall 44 and a pair of side walls 46 that extend downward from the upper wall 44 to define an internal cavity 48 having an initially open bottom that is closed by a bottom plate 50 when fully assembled. The first end 32 of the trailing arm assembly 30 includes an arcuate mounting portion 52 to receive a bushing tube 54 for pivotal attachment to the vehicle structure with the bracket 34. The arcuate mounting portion 52 does not completely surround the bushing tube 54 and includes a centrally located curved finger portion 52a extending from the upper wall 44 to surround an upper portion of the bushing tube 54 and a pair of side arm portions 52b formed as part of the side walls 46 that extend underneath the bushing tube 54. The centrally located curved finger portion 52a is positioned between the side arm portions 52b to provide a stable and evenly distributed load.

An axle wrap 56 is secured to the trailing arm body 40 at the axle mount portion 42, which is located at a position between the first 32 and second 36 ends of the trailing arm assembly 30. In one example, the trailing arm body 40 is welded to the axle wrap 56 at a weld attachment interface. The weld attachment interface comprises one or more welds that secure at least inboard and outboard edges of the side walls 46 to the axle wrap 56.

The axle wrap 56 includes a first wrap portion 56a and a second wrap portion 56b that each define an axle receiver portion 56c. The axle receiver portions 56c cooperate to substantially surround the trailer axle 12. The first 56a and second 56b wrap portions include upper edges 56d and lower edges 56e. When installed on the trailer axle 12 the upper edges 56d face each other but do not contact each other and the lower edges 56e face each other but do not contact each other. Backing strips 58 are located between the axle wrap 56 and trailer axle 12 at the upper 56d and lower 56e edges (see FIG. 10).

A spring pedestal 60 is supported at the second end 36 of the trailing arm assembly. In on example, the spring pedestal 60 includes a base plate portion 60a that is positioned over the upper wall 44. The base plate portion 60a supports that resilient member 38. A rear plate 62, best shown in FIGS. 6 and 8, encloses an open rear end of the trailing arm body 40.

Figure 8:
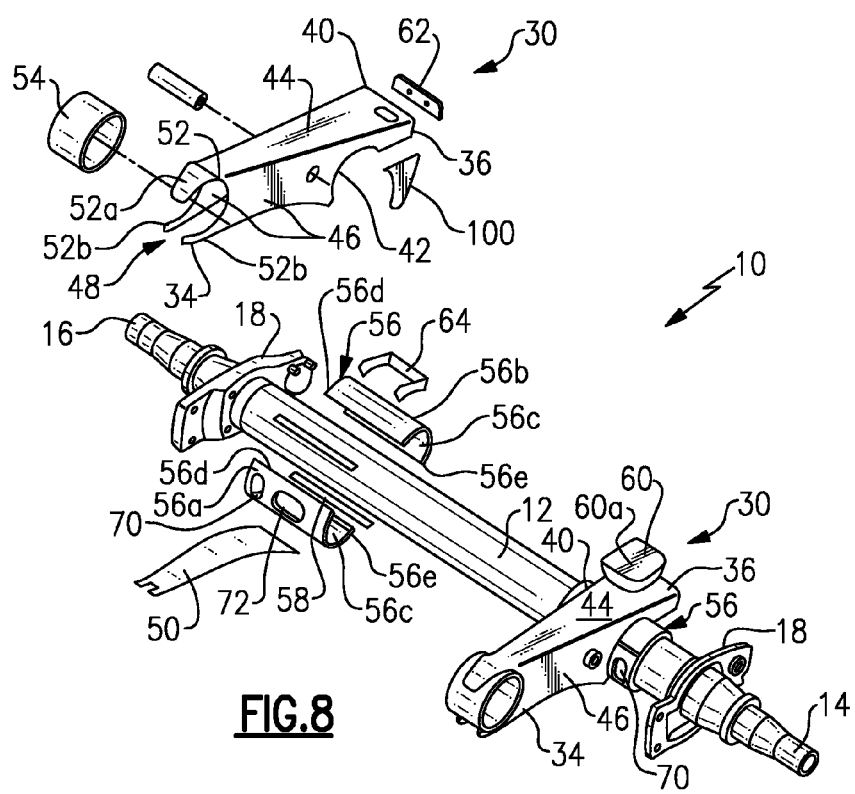
FIG. 8 is an exploded view of a trailing arm assembly from the suspension shown in FIG. 2.
Figure 9:
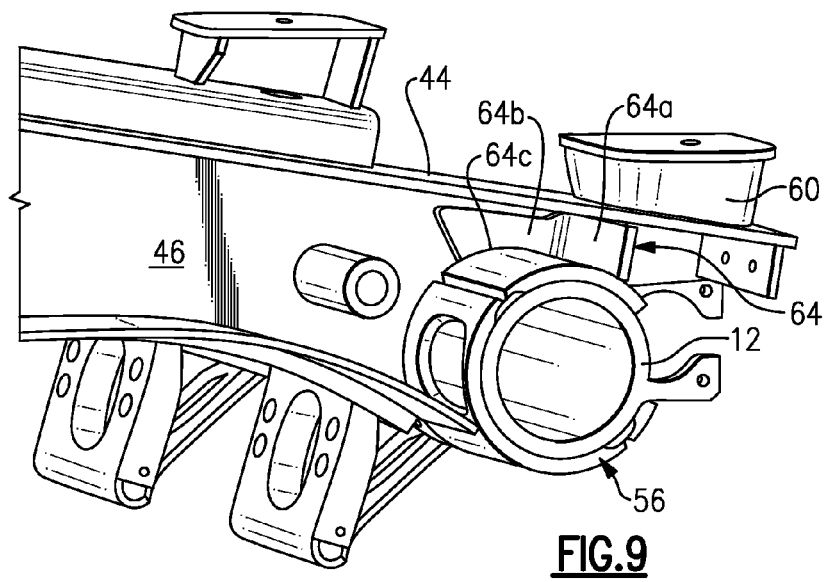
FIG. 9 is an enlarged cross-sectional view of the trailing arm assembly and a reinforcement bracket.
Figure 10:
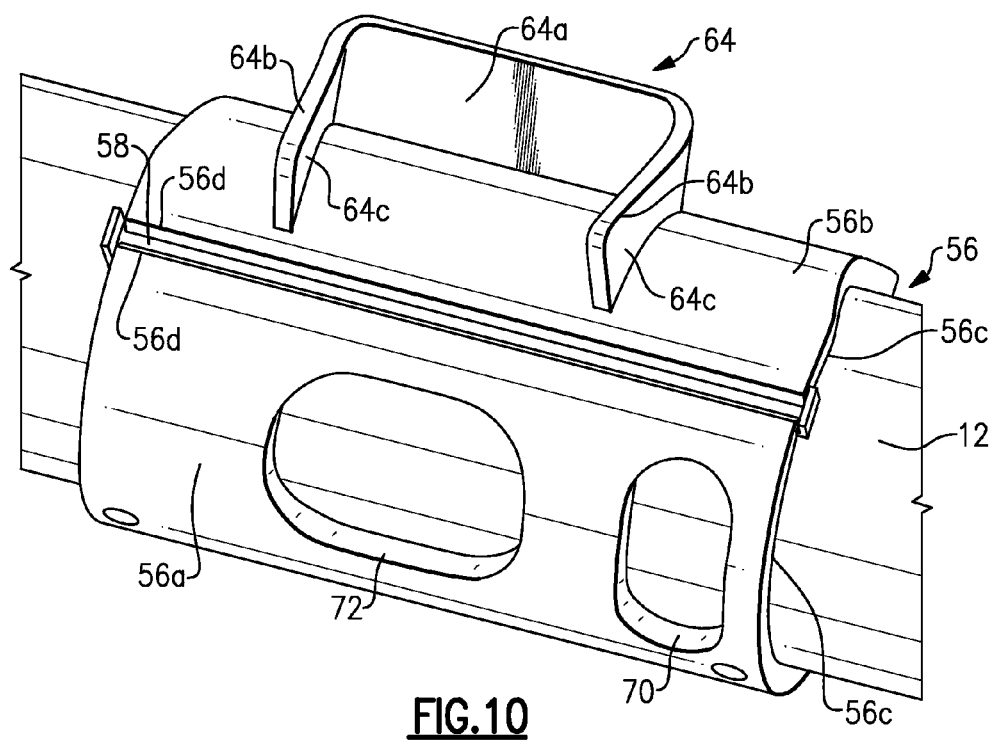
FIG. 10 is an enlarged view of the reinforcement bracket and associated axle wrap.

Each axle wrap 56 includes one or more additional axle wrap features that improves overall suspension fatigue life. An example of one such axle wrap feature is shown in FIGS. 8-10. In this example, the axle wrap feature comprises a reinforcement bracket 64 that is located within the internal cavity 48 of the trailing arm body 40 and which is attached to both the trailing arm body 40 and the axle wrap 56. The reinforcement bracket 64 reduces stress in the trailing arm-to-wrap weld interface, located at the top inboard side, which traditionally has been a failure location. Thus, using the reinforcement bracket 64 increases suspension fatigue life.

As shown in FIGS. 9-10, the reinforcement bracket 64 includes a vertical wall portion 64a extending upwardly from an upper surface of the axle wrap 56 toward a lower surface of the upper wall 44 and a pair of longitudinally extending arms 64b extending transversely from opposing ends of the vertical wall 64a. Each of the longitudinally extending arms 64b includes an arcuate surface 64c that is attached to the axle wrap 56 at a weld interface.

The reinforcement bracket 64 is located within the internal cavity 48 with one longitudinally extending arm 64b abutting against one of the side walls 46 and the other longitudinally extending arm abutting against the opposite side wall 46. The upper edge of the vertical wall portion 64a extends above upper edges of the arms 64b to contact an inner surface of the upper wall 44. This reinforcement bracket configuration provides a simple, lightweight and easy to install reinforcing member that significantly improves suspension fatigue life.

Figure 5:
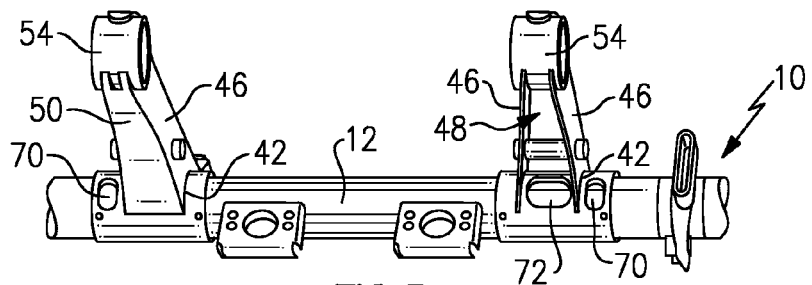
FIG. 5 is a bottom view of FIG. 2.

Another axle wrap feature that improves suspension fatigue life is an additional external weld window 70 as best shown in FIGS. 5, 8, and 10. In the example shown, the first wrap portion 56a includes an internal weld window 72 that is positioned within the internal cavity 48 defined by the trailing arm body 40. Once all welding within the internal cavity 48 has been completed, the bottom plate 50 is then attached to the side walls 46 at a weld attachment interface, for example.

The external weld window 70 comprises an additional weld window in the axle wrap 56 that is positioned external to the trailing arm body 40. In one example, the external weld window is positioned outboard of each respective trailing arm assembly 30. This outboard location is between the trailing arm body 40 and a respective one of the first 14 and second 16 axle ends. The term "outboard" refers to a direction that is outwardly away from to a vehicle center and the term "inboard" refers to a direction that in inwardly toward a vehicle center. In the example shown, the outboard external weld window 70 is of a smaller size than the internal weld window 72.

Cracks have been known to develop at an inboard edge of the internal weld window 72. By adding a smaller external weld window 70 outboard of the trailing arm body 40, stress is reduced at the internal weld window 72 resulting in increased fatigue life. Further, the outboard external weld window 70 more evenly distributes trailing arm loads, which are naturally biased toward the inboard side. More evenly distributing the trailing arm loads also increases fatigue life.

Figure 17:
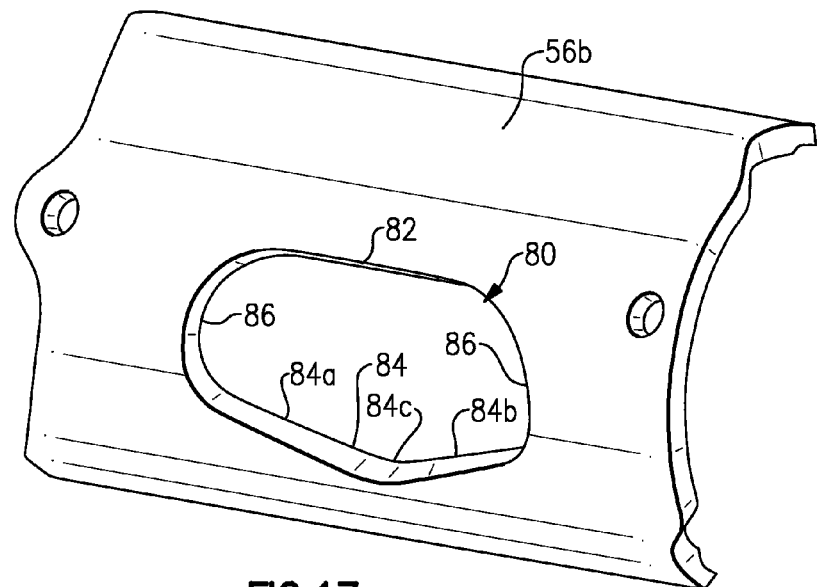
FIG. 17 is an external perspective view of a rear wrap of the axle wrap from the trailing arm assembly.
Figure 18:
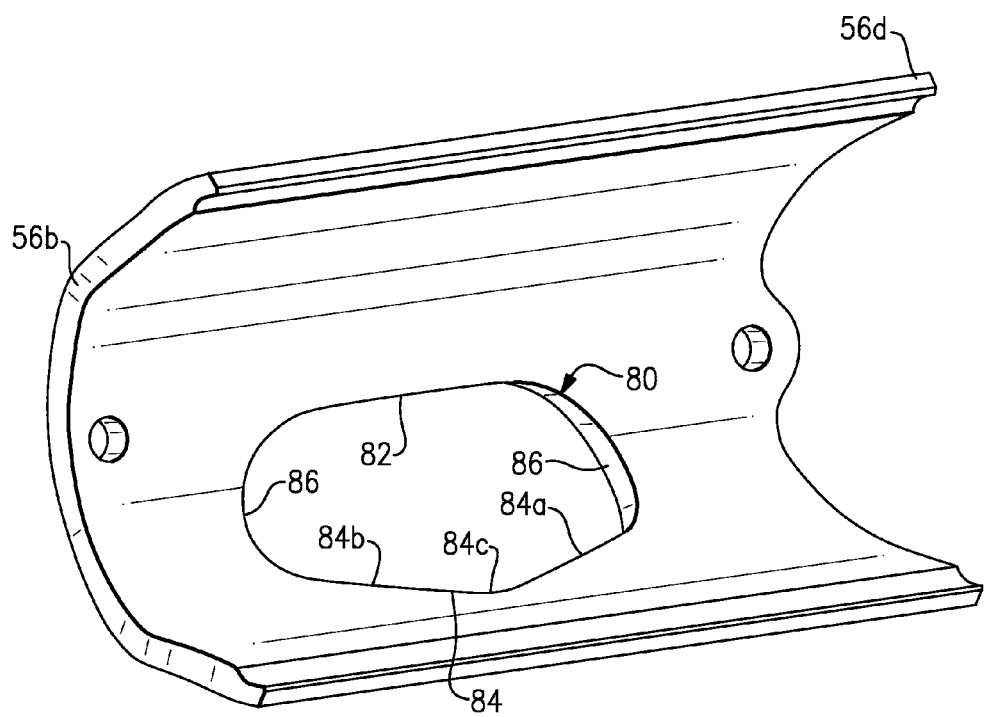
FIG. 18 is an internal perspective view of the rear wrap of FIG. 17.

Another axle wrap feature that improves suspension fatigue life is a weld window 80 having a modified weld window shape that is best shown in FIGS. 17-18. As discussed above, the first wrap portion 56a includes the internal weld window 72 and the external weld window 70. The second wrap portion 56b also includes a weld window 80 by which the second wrap portion 56b is attached to the trailer axle 12. The weld window 80 is defined by an upper edge 82, a lower edge 84 and a pair of side edges 86 that connect the upper 82 and lower 84 edges. The lower edge 84 comprises a V-shaped surface with side edge portions that are vertically higher than a central portion of the V-shaped surface.

In one example, the lower edge 84 includes at least one edge surface portion that is non-parallel to a surface of the upper edge 82. In the example shown, the upper edge 82 comprises a generally linear surface that extends in a direction that is generally parallel to the lateral axis A. The side edges 86 provide arcuate C-shaped transition surfaces that curve outwardly and downwardly, and then inwardly and downwardly toward the lower edge 84. The lower edge 84 includes a first surface portion 84a that extends from one side edge 86 and a second surface portion 84b that extends from the other side edge 86. The first 84a and second 84b surface portions meet at an apex area 84c, which has a slight curvature. The first 84a and second 84b surface portions are generally linear surfaces that are sloped downwardly and inwardly toward each other to form a shallow V-shape. The first 84a and second 84b surface portions are thus orientated obliquely relative to the surface that defines the upper edge 82. By modifying the bottom edge profile in this manner, the overall fatigue life significantly increases.

It should be understood that while the upper edge 82 is shown as being generally linear, the upper edge 82 could have different configurations with the V-shaped bottom edge profile providing the increased fatigue life.

Another axle wrap feature that increases fatigue life is a mount surface 90 for a spring pedestal 92. FIGS. 1-9 show a configuration with a spring pedestal 60 that is configured for lighter load applications. One of the benefits of the subject invention is that the trailing arm assembly 30 comprises a modular configuration that can be easily modified for higher load capacity. For example, the trailing arm configuration of FIGS. 1-9 can be modified to increase capacity by up to 7,000 lbs by simply changing the bushing tube 54 and the spring pedestal.

FIGS. 11-16 show the spring pedestal 92 in greater detail. The spring pedestal 92 includes a base plate portion 92a that supports the resilient member 38 (FIG. 12) and a side wall portion 92b that extends downwardly from the base plate portion 92a to the mount surface 90 on the axle wrap 56. In the example shown, the side wall portion 92b is positioned inboard of the trailing arm body 40 and extends to a distal end that is directly attached to the mount surface 90 of the axle wrap 90 at a weld attachment interface.

Figure 13:
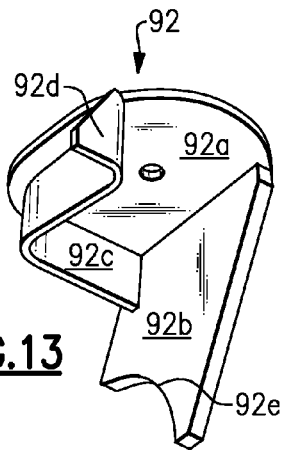
FIG. 13 is a bottom view of the spring pedestal of FIG. 11.
Figure 14:
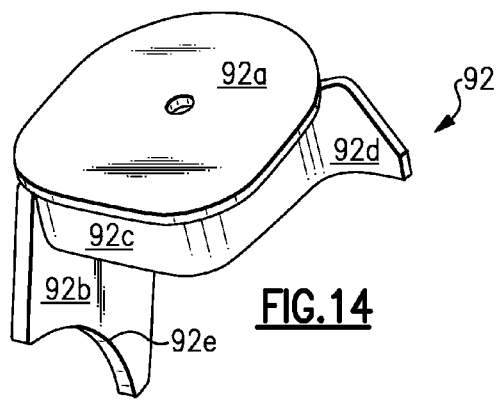
FIG. 14 is a top view of the spring pedestal of FIG. 11.
Figure 11:
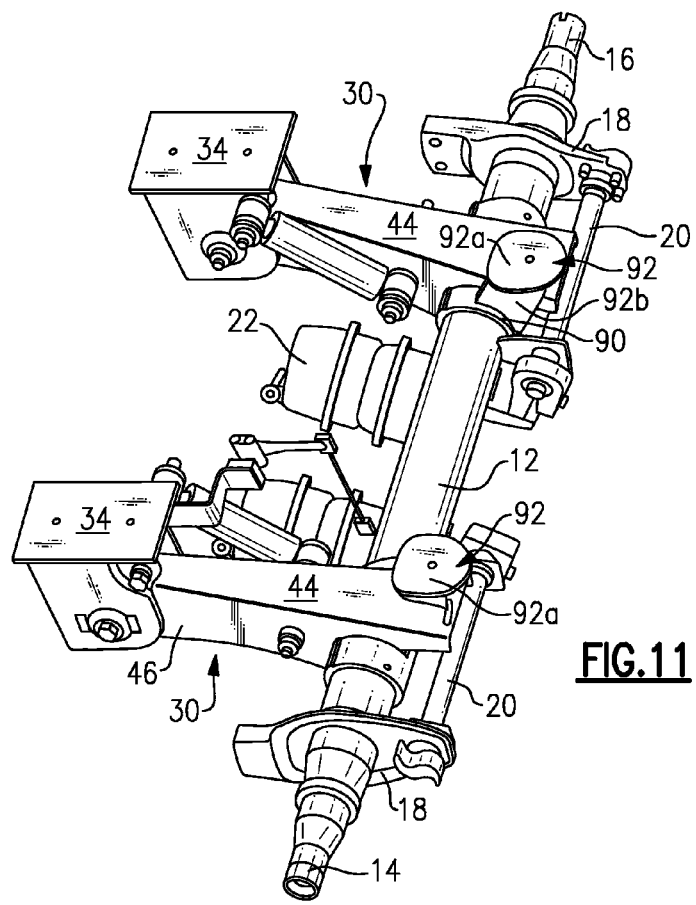
FIG. 11 is a perspective view of a trailing arm suspension similar to that of FIG. 1 but which includes another example of a spring pedestal.
Figure 12:
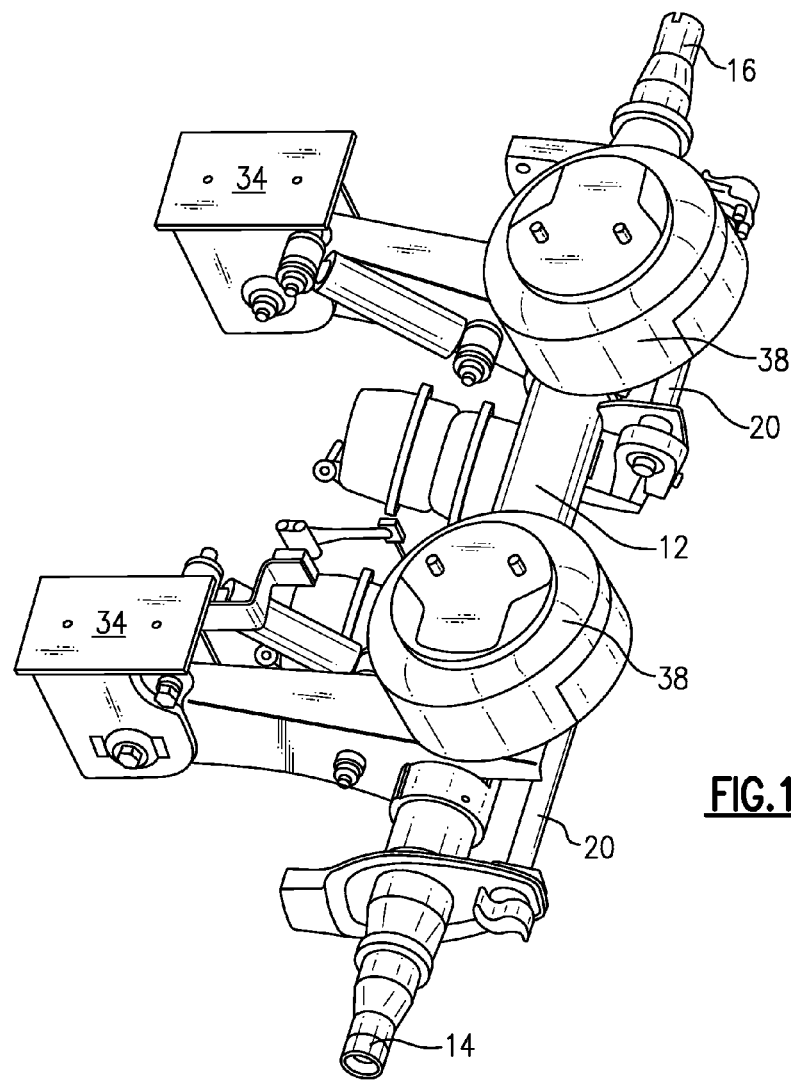
FIG. 12 is a view similar to FIG. 11 but which includes the air springs.
Figure 15:
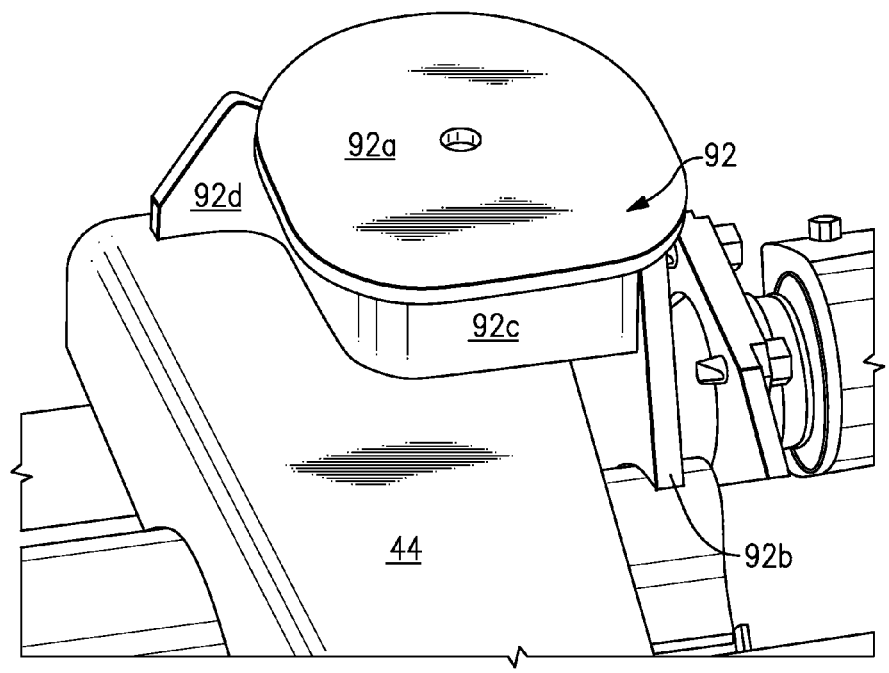
FIG. 15 is an enlarged front view of the spring pedestal, axle wrap, and trailing arm body as shown in FIGS. 11-12.
Figure 16:
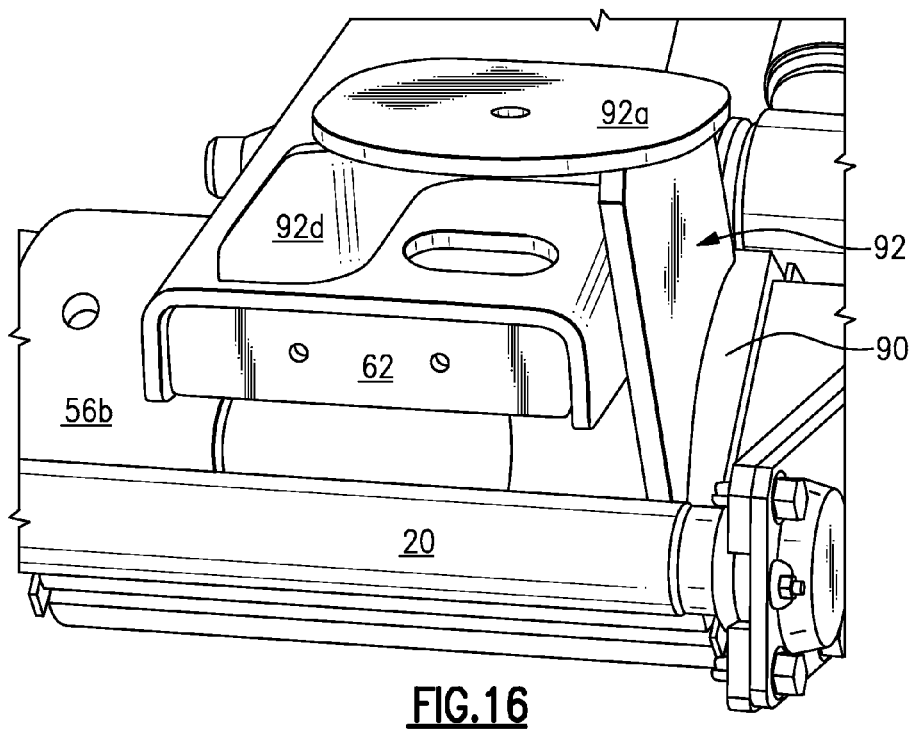
FIG. 16 is a rear view of FIG. 15.

As shown in FIGS. 13-14, the spring pedestal 92 includes a vertical flange portion 92c that extends downwardly from the base plate portion 92a to be supported on an upper surface of the upper wall 44. The base plate portion 92a is thus spaced above the upper wall 44 by a gap. The vertical flange portion 92c includes a curved extension portion 92d that extends in an outboard direction away from the base plate portion 92a and across the upper wall 44 to further enhance stability. The side wall portion 92b extends downwardly form the inboard side of the base plate portion 92a and includes an arcuate portion 92e that curves around the axle wrap 56 at the mount surface 90. By transferring some of the load directly to the axle wrap 56 via the side wall portion 92b, stress on the trailing arm is reduced and suspension fatigue life increases.

Figure 2:
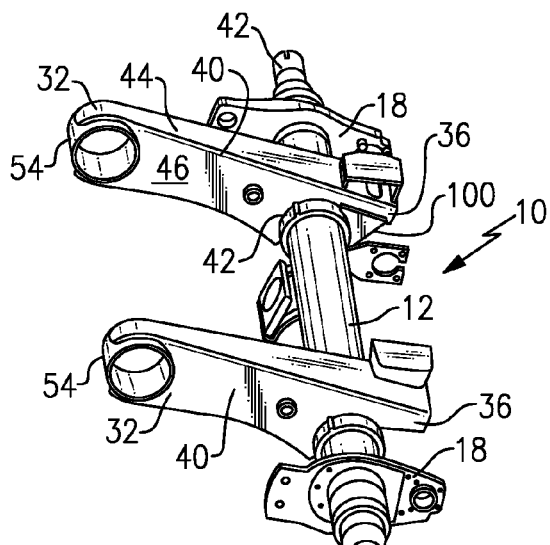
FIG. 2 is a view similar to FIG. 1 but with the air springs, brake chambers, and frame mounting structure removed.
Figure 3:
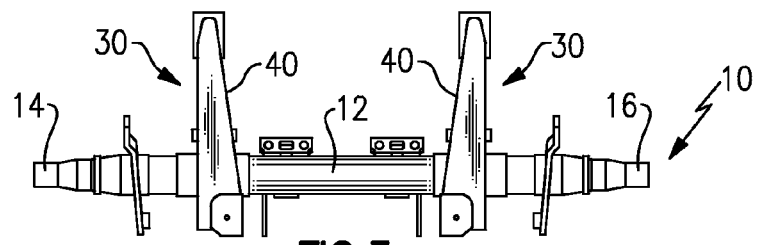
FIG. 3 is a top view of FIG. 2.
Figure 4:
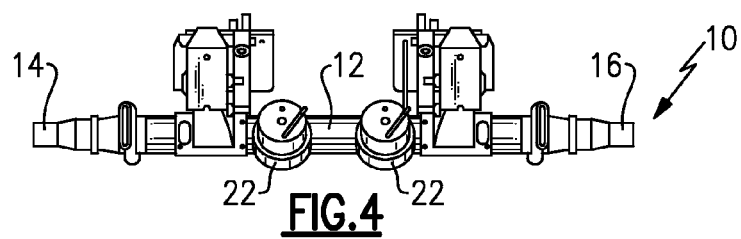
FIG. 4 is a front view of FIG. 1.
Figure 6:
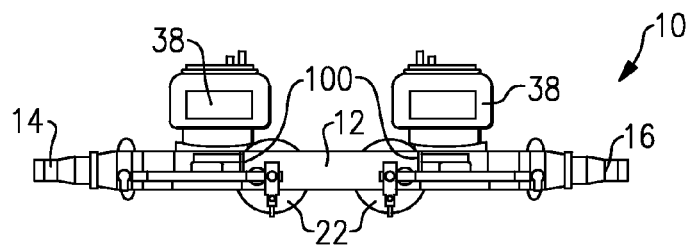
FIG. 6 is a rear view of FIG. 1.
Figure 7:
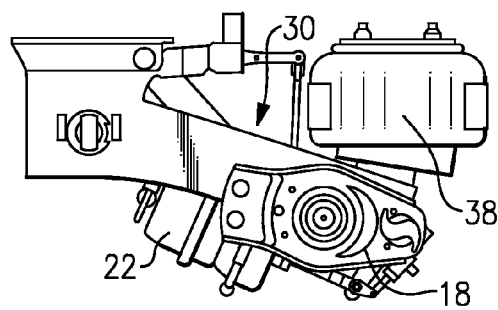
FIG. 7 is a side view FIG. 1.

Another axle wrap feature comprises a gusset 100 that is positioned at the second end 36 of the trailing arm assembly 30 as shown in FIGS. 2, 6, and 8. The gusset 100 is welded at an inboard location of the trailing arm assembly 30 and serves to further increase strength.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A trailing arm assembly for a suspension comprising:
a trailing arm body including an axle mount portion; and
an axle wrap including an axle receiver portion to be attached to an axle body, said axle receiver portion configured to substantially surround the axle body, and said trailing arm body being attached to said axle wrap at said axle mount portion, and wherein said axle wrap includes at least one axle wrap feature that improves suspension fatigue life.

2. The trailing arm assembly according to claim 1 wherein said axle wrap feature comprises a reinforcement bracket that is attached to said trailing arm body and is attached to a top of said axle wrap.

3. The trailing arm assembly according to claim 2 wherein said trailing arm body comprises a box-shaped structure having an upper wall and a pair of side walls that define an internal cavity having an open bottom that is closed by a bottom plate, and wherein said reinforcement bracket is located within said internal cavity between an upper surface of said axle wrap and a lower surface of said upper wall.

4. The trailing arm assembly according to claim 3 wherein said reinforcement bracket includes a first weld interface to said axle wrap and a second weld interface to an internal surface of said trailing arm body.

5. A trailing arm assembly for a suspension comprising:
a trailing arm body including an axle mount portion; and
an axle wrap including an axle receiver portion to be attached to an axle body, said trailing arm body being attached to said axle wrap at said axle mount portion, and wherein said axle wrap includes at least one axle wrap feature that improves suspension fatigue life, wherein said axle wrap includes at least one internal weld window located within an internal cavity of said trailer arm body, and wherein said axle wrap feature comprises an external weld window formed within said axle wrap at a location external to said trailing arm body.

6. The trailing arm assembly according to claim 5 wherein said external weld window is positioned outboard of said trailing arm body at a position laterally between said trailing arm body and an associated wheel end.

7. The trailing arm assembly according to claim 1 wherein said axle wrap feature comprises a mount interface for a spring pedestal.

8. A trailing arm assembly for a suspension comprising:
a trailing arm body including an axle mount portion; and
an axle wrap including an axle receiver portion to be attached to an axle body, said trailing arm body being attached to said axle wrap at said axle mount portion, and wherein said axle wrap includes at least one axle wrap feature that improves suspension fatigue life, wherein said axle wrap feature comprises a mount interface for a spring pedestal, and wherein said spring pedestal includes a support plate positioned over an upper surface of said trailing arm body and at least one side wall portion that is attached to said axle wrap at said mount interface.

9. The trailing arm assembly according to claim 8 wherein said side wall portion is located inboard of said trailing arm body at a position laterally between said trailing arm body and a vehicle center.

10. A trailing arm assembly for a suspension comprising:
a trailing arm body including an axle mount portion; and
an axle wrap including an axle receiver portion to be attached to an axle body, said trailing arm body being attached to said axle wrap at said axle mount portion, and wherein said axle wrap includes at least one axle wrap feature that improves suspension fatigue life, wherein said axle wrap feature comprises a weld window defined by an upper edge, a lower edge, and a pair of side edges connecting said upper and lower edges and wherein said lower edge comprises a V-shaped surface.

11. A trailing arm assembly for a suspension comprising:
a trailing arm body including an axle mount portion; and
an axle wrap including an axle receiver portion to be attached to an axle body, said trailing arm body being attached to said axle wrap at said axle mount portion, and wherein said axle wrap includes at least one axle wrap feature that improves suspension fatigue life, wherein said axle wrap comprises first and second wrap portions and wherein said at least one axle wrap feature comprises a plurality of axle wrap features including at least a reinforcement bracket attached to said trailing arm body and said axle wrap, an external window weld formed within one of said first and second wrap portions at a location that is external to said trailing arm body, a mount interface for a spring pedestal, and a weld window formed within the other of said first and second wrap portions defined by a lower edge surface that comprises a V-shaped surface.

12. A trailing arm assembly for a suspension comprising:
a trailing arm body including an axle mount portion;
an axle wrap including an axle receiver portion to be attached to an axle body, said axle receiver portion configured to substantially surround the axle body, and said trailing arm body being attached to said axle wrap at said axle mount portion; and
a reinforcement bracket attached to said trailing arm body and said axle wrap.

13. The trailing arm assembly according to claim 12 wherein said trailing arm body comprises a box-shaped structure having an upper wall and a pair of side walls that define an internal cavity having an initially open bottom that is closed by a bottom plate, and wherein said reinforcement bracket is located within said internal cavity between an upper surface of said axle wrap and a lower surface of said upper wall.

14. A trailing arm assembly for a suspension comprising:
a trailing arm body including an axle mount portion, wherein said trailing arm body comprises a box-shaped structure having an upper wall and a pair of side walls that define an internal cavity having an initially open bottom that is closed by a bottom plate;
an axle wrap including an axle receiver portion to be attached to an axle body, said trailing arm body being attached to said axle wrap at said axle mount portion; and
a reinforcement bracket attached to said trailing arm body and said axle wrap, wherein said reinforcement bracket is located within said internal cavity between an upper surface of said axle wrap and a lower surface of said upper wall, and wherein said axle wrap includes first and second wrap portions with axle receiver portions that cooperate with each other to substantially surround the axle body, and wherein one of said first and second wrap portions includes an internal weld window positioned within said internal cavity and wherein said reinforcement bracket is attached to the other of said first and second wrap portions.

15. A trailing arm assembly for a suspension comprising:
a trailing arm body including an axle mount portion, wherein said trailing arm body comprises a box-shaped structure having an upper wall and a pair of side walls that define an internal cavity having an initially open bottom that is closed by a bottom plate;
an axle wrap including an axle receiver portion to be attached to an axle body, said trailing arm body being attached to said axle wrap at said axle mount portion; and
a reinforcement bracket attached to said trailing arm body and said axle wrap, wherein said reinforcement bracket is located within said internal cavity between an upper surface of said axle wrap and a lower surface of said upper wall wherein said reinforcement bracket includes a vertical wall portion extending upwardly from said upper surface of said axle wrap toward said lower surface of said upper wall and a pair of longitudinally extending arms extending transversely from opposing ends of said vertical wall, and wherein each of said longitudinally extending arms includes an arcuate surface that is attached to said axle wrap at a weld interface.

16. A trailing arm assembly for a suspension comprising:
a trailing arm body including an axle mount portion; and
an axle wrap including an axle receiver portion to be attached to an axle body, said trailing arm body being attached to said axle wrap at said axle mount portion, and wherein said axle wrap includes an internal weld window located at a position within an internal cavity defined by said trailing arm and an external weld window located at a position that is external to said trailing arm.

17. The trailing arm assembly according to claim 16 wherein said axle wrap includes first and second wrap portions with axle receiver portions that cooperate with each other to substantially surround the axle body, and wherein one of said first and second wrap portions includes said internal weld window and wherein said one of said first and second wrap portions also includes said external weld window at an outboard position that is laterally between said trailing arm body and an associated wheel end.

18. A trailing arm assembly for a suspension comprising:
a trailing arm body including an axle mount portion;
an axle wrap including an axle receiver portion to be attached to an axle body, said trailing arm body being attached to said axle wrap at said axle mount portion; and
a spring pedestal including a support plate positioned over an upper surface of said trailing arm body and at least one side wall portion extending downwardly from said support plate, said side wall portion being directly attached to said axle wrap at a mount interface.

19. The trailing arm assembly according to claim 18 wherein said side wall portion is located inboard of said trailing arm body at a position laterally between said trailing arm body and a vehicle center.

20. A trailing arm assembly for a suspension comprising:
a trailing arm body including an axle mount portion; and
an axle wrap including an axle receiver portion to be attached to an axle body, said trailing arm body being attached to said axle wrap at said axle mount portion, and wherein said axle wrap includes a weld window defined by a lower edge surface comprising a V-shaped surface.

21. The trailing arm assembly according to claim 20 wherein said axle wrap includes first and second wrap portions with axle receiver portions that cooperate with each other to substantially surround the axle body, and wherein one of said first and second wrap portions includes said weld window and wherein the other of said first and second wrap portions includes another weld window that is positioned within an internal cavity defined by said trailing arm body.

22. The trailing arm assembly according to claim 20 wherein said lower edge surface of said weld window has at least one portion that is non-parallel to an upper edge surface of said weld window.

23. A vehicle suspension comprising:
an axle extending along a lateral axis between first and second axle ends to respectively support first and second wheels;
a first trailing arm assembly mounted adjacent said first axle end;
a second trailing arm assembly mounted adjacent said second axle end, said first and said second trailing arm assemblies extending in a longitudinal direction transverse to said lateral axis; and
wherein each of said first and said second trailing arm assemblies include
a trailing arm body comprising a box-shaped structure having an upper wall and a pair of side walls that define an internal cavity having an open bottom that is closed by a bottom plate, wherein said trailing arm body has a first end to be pivotally attached to a frame structure and a second end that supports a resilient member, and wherein said trailing arm body includes an axle mount portion at a position between said first and second ends,
an axle wrap attached to said axle, said axle wrap comprising a first wrap portion and a second wrap portion that cooperate to substantially surround said axle, wherein one of said first and second wrap portions includes an internal weld window located within said internal cavity, and wherein said trailing arm body is attached to said axle wrap at said axle mount portion, a spring pedestal supported at said second end of said trailing arm body, and at least one additional axle wrap feature that improves suspension fatigue life.

24. The vehicle suspension according to claim 23 wherein said at least one additional axle wrap features comprises at least one of:

a mount interface for said spring pedestal, said spring pedestal including a support plate positioned over an upper surface of said second end of said trailing arm body and at least one side wall portion extending downwardly from said support plate, said side wall portion being directly attached to said axle wrap at said mount interface, an external weld window formed within said one of said first and second wrap portions at a location that is external to said trailing arm body, a reinforcement bracket located within said internal cavity between an upper surface of said axle wrap and a lower surface of said upper wall, wherein said reinforcement bracket includes a first weld interface to said axle wrap and a second weld interface to an internal surface of said trailing arm body, and a weld window defined by a lower edge surface comprising a V-shaped surface.

25. The trailing arm assembly according to claim 1 wherein said axle wrap comprises a first wrap portion with a first receiver portion that extends around one side of the axle body and a second wrap portion with a second receiver portion that extends around an opposite side of the axle body.

26. The trailing arm assembly according to claim 12 wherein said axle wrap comprises a first wrap portion with a first receiver portion that extends around one side of the axle body and a second wrap portion with a second receiver portion that extends around an opposite side of the axle body.

* * * * *